H. A. FAULKNER.
NUT LOCK.
APPLICATION FILED NOV. 6, 1915.

1,189,079.

Patented June 27, 1916.

WITNESSES
Edw. S. Hall.
Wm. Webster Downing.

INVENTOR
Hugh A. Faulkner.
BY Richard Owen.
ATTORNEY

UNITED STATES PATENT OFFICE.

HUGH A. FAULKNER, OF BURKMERE, SOUTH DAKOTA.

NUT-LOCK.

1,189,079. Specification of Letters Patent. Patented June 27, 1916.

Application filed November 6, 1915. Serial No. 60,040.

*To all whom it may concern:*

Be it known that I, HUGH A. FAULKNER, a citizen of the United States, residing at Burkmere, in the county of Faulk and State of South Dakota, have invented certain new and useful Improvements in Nut-Locks, of which the following is a specification.

My invention relates to nut locks and more particularly to a nut lock of the top stop type.

The primary object of my invention resides in the provision of a novel supporting means for removable association with a bolt for intimate contact with a nut, novel locking means being associated with the supporting means for removably holding the nut on the bolt and for preventing accidental reverse rotation of the nut.

A still further object of my invention resides in the provision of a device of the character described that is simple in construction, efficient in operation and one that can be manufactured and placed upon the market at a minimum cost.

Other objects as well as the nature, characteristic features and scope of my invention will be more readily understood from the following description taken in connection with the accompanying drawings and pointed out in the claim forming a part of this specification.

Figure 1:
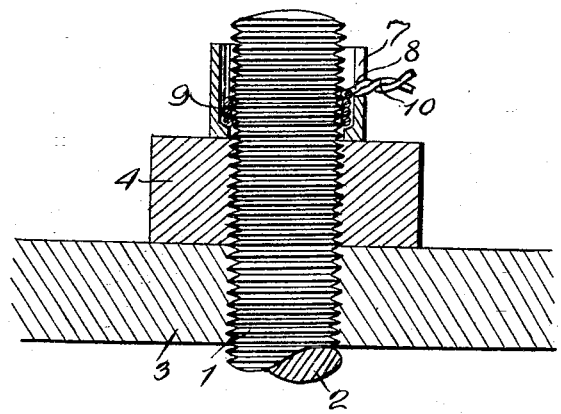
Figure 3:
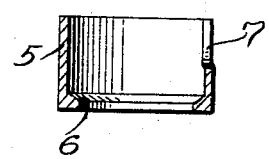
Figure 2:
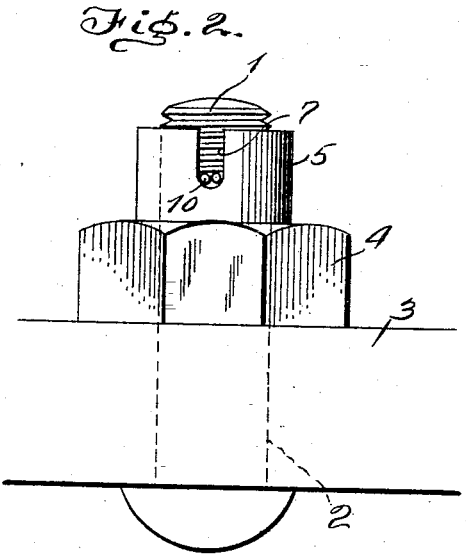
Figure 4:
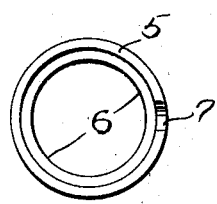

In the drawings:—Figure 1 is a vertical sectional view of my invention associated with a nut and a bolt, the latter being shown in elevation; Fig. 2 is a side elevational view of my invention; Fig. 3 is a vertical sectional view of the supporting means or shell; and Fig. 4 is a top plan view of the shell.

Referring more particularly to the drawings in which similar reference numerals designate like and corresponding parts throughout the different views, I have associated the threaded end 1 of the shank of a bolt 2 with a piece of work 3, the threaded end of the shank being removably engaged with a nut 4 of the usual type, the latter being removably held on the bolt in its desired position of adjustment through the provision of my improved locking device.

My improved locking device or means in this instance resides in the provision of a supporting means or tubular shell 5, the lower inner bore of which is provided with an inwardly extending and beveled annular flange 6. The diameter of the inner edge of the flange is slightly greater than the diameter of the threaded end of the bolt which permits of the shell being arranged about the bolt so that it may rest in intimate contact with the outer surface of the nut as is illustrated to advantage in the drawings. The shell is further provided with a vertical slot 7 for a purpose to be hereinafter described.

For the purpose of removably locking the shell in intimate contact with the nut and thereby prevent the reverse or accidental movement of the nut on the threaded end of the bolt, I have provided my improved locking means, in this instance, consisting of a single strand of flexible wire 8. This wire is wrapped about the threaded end of the bolt between the threads and the inner bore of the shell 6, the convolutions 9 of the wire resting between the threads, the free terminals of the wire being extended through the slot 7 and twisted as illustrated by the numeral 10. This twisting of the terminals causes the convolutions to tighten between the adjacent threads thereby holding the bottom of the shell in intimate contact with the nut and thus prevents rotation of the nut. The frictional engagement between the convolutions and the threads is such that the shell can not be rotated to consequently cause the convolutions to be worked free of the bolt.

Although I have shown and described the preferred embodiment of my invention I desire it to be understood that I am not to be limited to the exact details, however, I desire that great stress be laid upon the arrangement and coöperation of the supporting shell associated with the nut on the bolt and the wire for locking the shell in position, the frictional engagement of the convolutions preventing the movement of the shell and the nut.

From the above description taken in connection with the accompanying drawings, it can be easily seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claim and without sacrificing any of the advantages of my invention.

Having thus fully described my invention what I claim as new and desire to secure by Letters Patent, is:

The combination with a threaded end of a bolt, and a nut threaded thereon, of a supporting shell disposed about the bolt and arranged in intimate contact with the nut, the shell being provided with a vertical slot in the upper edge thereof, an inwardly extending annular flange projecting from the lower edge of the shell, a piece of flexible wire wrapped about the threads of the bolt and having the lowermost portion contacting with the flange, and the free ends of the piece of wire being arranged through the slot and twisted together to cause the wire to frictionally engage the threads of the bolt and consequently prevent outward movement of the nut on the bolt.

In testimony whereof I affix my signature in presence of two witnesses.

HUGH A. FAULKNER.

Witnesses:
D. H. LATHAM,
P. H. O'NEIL.

Copies of this patent may be obtained for five cents each, by addressing the "Commissioner of Patents, Washington, D. C."